Feb. 9, 1971 J. F. McELROY 3,561,926
ATTITUDE INSENSITIVE GAS GENERATOR
Filed April 10, 1968

INVENTOR:
JAMES F. McELROY,

BY *Carl O. Thomas*
HIS ATTORNEY.

United States Patent Office 3,561,926
Patented Feb. 9, 1971

3,561,926
ATTITUDE INSENSITIVE GAS GENERATOR
James F. McElroy, Hamilton, Mass., assignor to General Electric Company, a corporation of New York
Filed Apr. 10, 1968, Ser. No. 720,182
Int. Cl. B01j 7/02
U.S. Cl. 23—282                                                5 Claims

ABSTRACT OF THE DISCLOSURE

A ball is floated on the surface of a liquid reactant confined within a sealed container. Within the ball is a body providing a reaction surface at which gas is produced when the liquid reactant is brought in contact. A flexible conduit withdraws gas from an upper portion of the ball while apertures are provided in the ball below the level of the liquid reactant.

Figure 1:
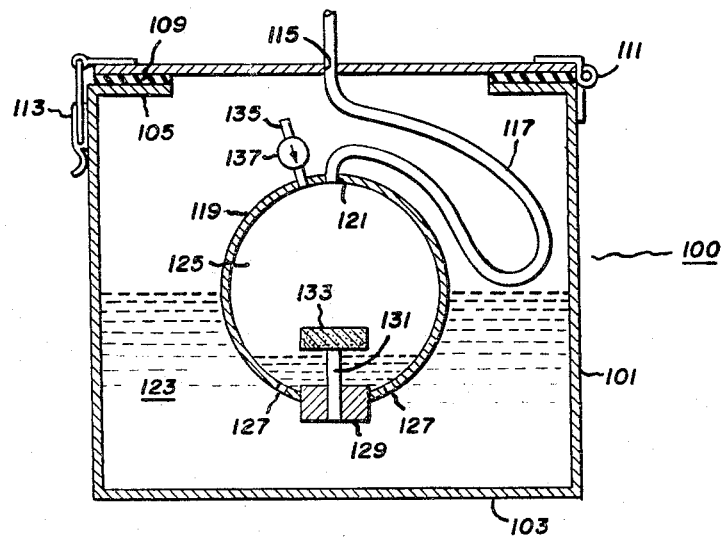

My invention relates to an attitude insensitive generator for producing gas by contact of a liquid reactant with a solid body providing a reaction surface.

The production of a gas by contact of a liquid and a solid is well understood in the art. A class of gas generators that has achieved substantial popularity includes those termed Kipp generators. These generators function by bringing a liquid reactant into contact with a reaction surface represented by a solid body. As gas accumulates within the generator, the liquid is slowly forced out of contact with the solid reaction surface so that the rate of gas evolution is reduced or stopped. When a portion of the gas is bled from the generator, the liquid reactant contacts the reaction surface and gas evolution again occurs. The simplicity of Kipp generators is that they are demand responsive—that is, they generate gas at the rate it is withdrawn from the generator. When gas removal is slowed, the evolution of gas slows proportionately. This is a significant advantage, since no elaborate controls are required to generate gas at the required rate. Rather, for most practical applications the generator is self regulating.

Despite the significant advantages of Kipp type generators, conventional Kipp generators suffer the notable disadvantage of being attitude sensitive. That is, if the generator is tilted or inverted in use, the self regulating characteristics of the generator are destroyed and gas evolution may terminate or accelerate to a maximum and uncontrolled rate of evolution. Attitude sensitivity poses a significant obstacle toward utilizing Kipp generators for highly mobile applications. For example, where a gas generator is required to be utilized as a gas source for a small fuel cell unit powering a small portable radio receiver or transmitter, use of an attitude sensitive Kipp generator as a gas source could constitute a substantial inconvenience if not an actual hazard.

It is an object of my invention to provide a demand responsive gas generator that is attitude insensitive.

In one aspect my invention relates to an attitude insensitive generator for producing gas by contact of a liquid reactant with a solid body providing a reaction surface. The generator is comprised of a liquid impervious enclosure means defining a first chamber for confining the liquid reactant. A gas impervious enclosure means defining a second reaction chamber having the solid body positioned therein lies within the first chamber for floatation on the liquid reactant. The gas impervious means includes means for offsetting the center of gravity of said gas impervious means with respect to its center of volume. Aperture means communicate the reaction chamber with the exterior of the gas impervious enclosure means. The aperture means is located on a lower portion of the gas impervious enclosure means for contact with the liquid reactant. Flexible conduit means are interconnected to communicate an upper portion of the reaction chamber with the exterior of the liquid impervious enclosure means.

Figure 2:
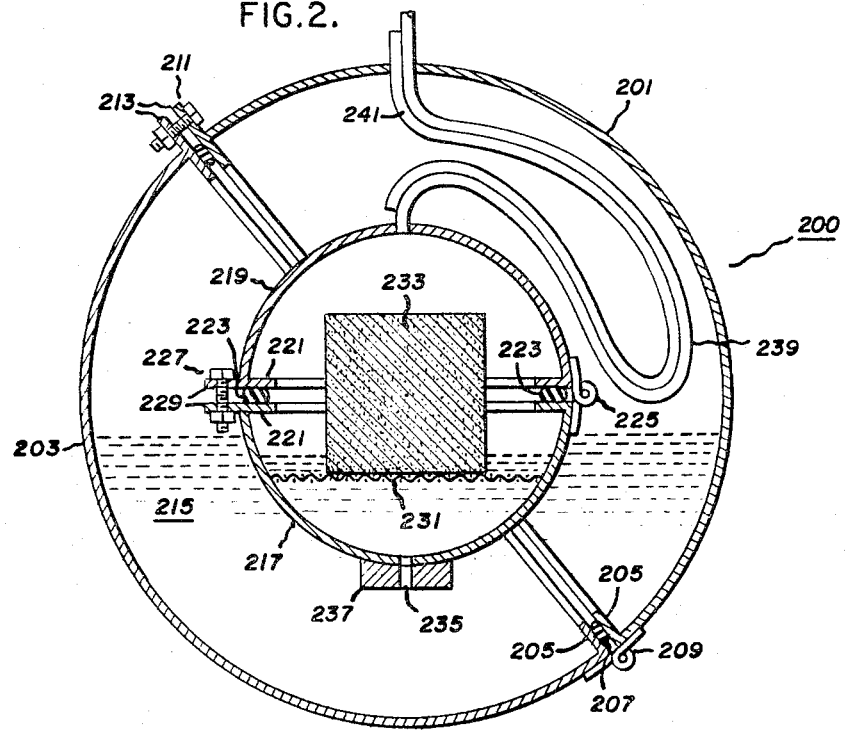

My invention may be better appreciated by reference to the following detailed description considered in conjunction with the drawings, in which:

FIGS. 1 and 2 are vertical sections of alternate embodiments of my invention.

Noting FIG. 1, a gas generator 100 is illustrated in vertical section comprised of an outer housing portion 101 having a closed lower end 103 and terminating at its open upper end in an inwardly extending flange 105 providing a sealing surface. A closure member overlies the outer housing portion and is sealingly associated therewith by an interposed peripheral gasket 109. For convenience of use the closure member may be connected to the outer housing portion as indicated by hinge 111. To fasten the closure member in the position shown and to compress the gasket into sealing relation with the closure member and flange a hasp fastener 113 is provided.

An opening 115 is provided in the closure member through which a flexible conduit 117 extends in sealing relation with the closure member. The terminus of the flexible conduit is sealingly attached to a sphere 119 as indicated at 121. The sphere floats on a liquid reactant 123 contained within the closure represented by the closure member and outer housing portion. The interior of the sphere defines a reaction chamber 125 for the generation of gas. A plurality of apertures 127 are located in the lower portion of the sphere beneath the surface of the liquid reactant. Connected to the lower portion of the sphere is a ballast weight 129. The ballast weight lowers the center of gravity of the composite represented by the weight and sphere in relation to its center of volume. This stabilizes the orientation of the sphere with the ballast weight lying in a lowermost location. A support post 131 positions a solid body 133 providing a reaction surface at a desired location within the reaction chamber. The solid body may itself be a reactant or may merely provide a catalytic surface at which reaction can occur, as is taught by Cliche et al. in copending application Ser. No. 720,181, titled "Process and Apparatus for Hydrogen Generation," filed on even date herewith and assigned to the General Electric Company, the disclosure of which is incorporated by reference. In the preferred form the solid body is Raney nickel and the liquid reactant is an aqueous alkaline solution of alkali borohydride.

As an optional safeguard against pressurization of the enclosed area lying above the liquid reactant, a conduit 135 is provided communicating the interior of the sphere with this area. A check valve 137 is provided to prevent gas escape in the reverse direction.

An alternate gas generator 200 constructed according to my invention is shown in vertical section in FIG. 2. Two hemispherical outer shells 201 and 203 are each provided with an inwardly extending flange 205. Between the flanges an O-ring seal 207 is provided. The shells are connected at one point by a hinge 209. The flanges are sealingly clamped against the O-ring by one or more tie-bolt assemblies 211 extending through peripherally aligned lugs 213 on the shells. Together the shells form an enclosure for a liquid reactant 215.

Floating on the liquid reactant is a gas impervious enclosure comprised of inner shells 217 and 219. Each inner shell is provided with an inwardly extending flange 221. An O-ring seal 223 sealingly cooperates with these flanges. The inner shells are connected by a hinge 225. The inner shell flanges are sealingly clamped against the O-ring 223 by one or more tie-bolt assemblies 227 extending through peripherally aligned lugs 229 on the inner shells.

The lower inner shell 217 contains a screen support 231 on which a solid body 233 rests. The solid body provides a reaction surface at its interface with the liquid reactant that enters the lower shell through the aperture 235. To stabilize the aperture in a position below the level of the liquid contained in the outer shells, a ballast weight 237 is attached to the lower shell. The weight serves the function of lowering the center of gravity of the gas impervious enclosure of which it is a part with respect to its center of volume.

Sealingly attached to the upper inner shell 219 and sealingly extending through one of the outer shells is a fluid conduit 239. This conduit delivers gas from the generator. A second, optional conduit 241 is attached to the gas delivery conduit 239. This second conduit extends from a location adjacent the upper outer surface of the upper inner shell to the exterior of an outer shell.

In operation, the gas generator 100 may be placed in operation by uncoupling the hasp fastener, raising the closure member and introducing the liquid reactant 123 into the outer housing portion 101. A variety of suitable liquid reactants are known to the art, so that the choice of a specific liquid reactant forms no part of my invention. Generally speaking aqueous alkaline solutions of alkali and alkaline earth hydrides as well as alkali borohydrides and alkali aluminum hydrides are suitable for incorporation where it is desired to generate hydrogen gas. For purposes of describing a specific preferred embodiment, the liquid reactant may be assumed to be an aqueous solution of an alkali borohydride such as sodium or potassium borohydride having a pH in excess of 11.5. If oxygen generation should be desired, the liquid reactant introduced may be hydrogen peroxide, aqueous chlorate, chlorite, or hypochlorite solution, etc. Sufficient liquid reactant is incorporated to float the sphere 119. The closure member is then repositioned on top of the outer housing portion so that apparatus appears as shown in FIG. 1. The outer housing portion, closure member, and seal 109 together form a liquid impervious enclosure from which the liquid reactant cannot escape, regardless of the orientation thereof.

A portion of the liquid reactant passes through the apertures 127 into the reaction chamber 125. Upon contact with the solid body 133 a reaction surface is provided at the solid-liquid interface thereof and gas is generated. Assuming for purposes of description, a catalytic body, such as a body of Raney nickel, constitutes the solid body 133, hydrogen gas would be generated by the contact of an aqueous alkaline hydride solution, such as an alkali borohydride solution. If oxygen is desired to be generated, any of the oxygen releasing liquid reactants above noted will interact with Raney nickel to release oxygen gas in like manner. The gas that is initially generated may be used to purge air or any other initially present gaseous impurity out of the system. The gas generated passes through the flexible conduit 117 to the exterior of the generator.

The rate of gas evolution corresponds to the rate of gas consumption. If the rate of gas consumption is relatively reduced, a slight positive pressure will develop within the reaction chamber as compared with the pressure exterior thereof within the liquid enclosure means. This will force a portion of the liquid reactant out of the sphere and reduce the areal extent of the reaction surface represented by the interface of the solid body and the liquid reactant. This in turn drops the rate of gas evolution. When the rate of gas consumption increases, the relative pressure within the reaction chamber will decrease slightly causing the level of liquid reactant within the sphere to increase and thereby increase the areal extent of the reaction surface. It is then apparent that the gas generator is demand responsive.

If the outer housing portion is tipped in either direction, the surface of the liquid reactant will remain horizontal and the sphere will remain in the same position with respect to the surface of the liquid. Thus the liquid reactant and sphere will automatically reposition themselves so that the sphere continues to float on the surface of the liquid reactant despite tilting of the liquid impervious enclosure means. The reorientation of the sphere with reference to the liquid impervious enclosure means is permitted by the flexibility of the conduit 117. It is noted that a length of flexible conduit is provided between the closure member and the sphere considerably in excess of the distance between these elements when positioned as illustrated in FIG. 1. The length of the flexible conduit is chosen to prevent its restraining the sphere from assuming its floating position on the surface of the liquid reactant. It is noted that the maximum distance between the connection of the conduit to the top of the sphere and to the closure member occurs when the liquid enclosure means is inverted from the position shown in FIG. 1. It is accordingly preferred that the conduit be of a length in excess of this distance.

If the center of gravity and center of volume (or buoyancy) of the sphere were identically located, the sphere would float on the surface of the liquid, but the orientation of the sphere with respect to the surface of the liquid would not be stable with the apertures 127 below the surface of the liquid reactant as desired. The ballast weight 129 lowers the center of gravity with respect to the center of volume insuring the sphere will float as illustrated.

Depending on the particular choice of reactants, some change in volume may occur in the fluid contained within the liquid impervious enclosure means but exterior of the sphere. For example, in the reaction of aqueous solutions of borohydrides a portion of the water may be converted to hydrogen gas causing the volume displacement of the liquid reactant to decrease during use of the apparatus. This will cause a negative pressure to develop within liquid impervious enclosure means. This does not necessarily pose any disadvantage, since it may be desired for the generator to supply gas at a pressure below ambient. Hydrogen feeds to fuel cells are frequently maintained below ambient pressure, for example, to insure that no hydrogen will leak from the fuel cells. The creation of a negative pressure within the liquid impervious enclosure means can be off-set, if desired, by forming the closure member, outer housing portion, or a portion of either or both of a flexible material. Another possible alternative, not illustrated, is to provide a one-way flow path from the exterior of the liquid impervious enclosure means to the interior. In a simple form this may be a check valve controlled conduit sealingly connected to this enclosure means.

Using certain types of reactants, there may be a tendency for parasitic gas generation. That is, some gas may be formed even when the solid body is completely out of contact with the liquid reactant. For example, if an aqueous hydride solution is maintained at an insufficient level of alkalinity, below 11.5, for example, it will tend to spontaneously decompose to liberate hydrogen. Also, if particles of the solid body 133 are dislodged during gas generation they may pass through the apertures 127 and collect in the bottom of the outer housing portion so as to continuously produce gas, regardless of demand.

To prevent a dangerous level of gas pressure from developing within the liquid impervious enclosure means but exterior of the sphere, the conduit 135 is provided to communicate the gas filled upper region of the liquid impervious enclosure means with the interior of the sphere. To prevent gas from passing from the interior of the sphere to its exterior a check valve 137 is provided. This check valve permits gas to flow into the sphere only when a predetermined pressure differential is reached.

The gas generator 200 operates in a very similar manner to the generator 100. The outer shells 201 and 203 cooperate with the O-ring seal 207 to form a liquid impervious enclosure means functionally similar to that of the generator 100. The inner shells 217 and 219 cooperate with the O-ring seal 223 to form a gas esclosure means similarly as the sphere 119. The significant variation in the generator 200 is that the shells of gas impervious enclosure means may be readily disassembled to replace the solid body 233. Accordingly, it is apparent that the gas impervious enclosure means of the generator 200 is well suited for enclosing a solid body that is consumed in gas generation. For example, a metal lying higher than hydrogen in the electromotive series, such as magnesium or aluminum, for example, may be used to form the solid body. As well understood, magnesium will react with a saline aqueous solution to produce hydrogen while aluminum will react with an alkaline aqueous solution to produce hydrogen.

Another distinctive feature of generator 200 is the employment of a second conduit 241 to communicate the gas contained with the liquid impervious enclosure means with the atmosphere. This functions to equilibrate the pressure within the liquid impervious enclosure means with the atmosphere at all times. Since the interior open end of the second conduit is at all times adjacent the upper surface of the gas enclosure means, it is impossible for liquid reactant to leave the generator through this conduit. If the liquid reactant volume decreases during operation of the generator, atmospheric air may be drawn in to offset this volume decrease and to prevent a negative pressure from developing within the liquid impervious enclosure means but exterior of the gas impervious enclosure means. If, on the other hand, parasitive gas generation occurs exterior of the gas impervious enclosure means, the second conduit 241 provides a ready escape path to prevent internal pressurization of the generator. To avoid any hazard of venting hydrogen to the atmosphere a catalytically active surface may be positioned adjacent the outer extremity of the second conduit to cause hydrogen to be spontaneously consumed during venting. This could, for example, take the form of a platinum activated carbon plug placed in the exterior extremity of the second conduit.

While I have described my invention with reference to preferred embodiments, it is appreciated that numerous structural variations will readily occur to those skilled in the art. For example, the choice of materials or structural elements to form the liquid impervious enclosure means may vary widely. To function as disclosed it is only necessary that this means be capable of preventing the liquid reactant from escaping from the generator. The permeability of this enclosure means to gas is of no importance. The liquid impervious enclosure means could, if desired, be formed wholly or partially of a liquid impervious but gas pervious material. Assuming such construction, the incorporation of a separate means, such as the second conduit 241, to equilibrate the gases internally and externally of the generator would be obviated. In the particular gas impervious enclosure means illustrated, structural provisions are made so that the gas impervious enclosure means may be readily removed. This may be convenient in many applications, but is not necessary. Where the solid body which provides a reaction surface is a catalyst that is not consumed in use, it is unnecessary that the gas impervious enclosure means be accessible for maintenance of the generator. Accordingly, the liquid impervious enclosure means may be constructed as a unitary element surrounding the gas impervious enclosure means and provided with only a small opening for the introduction of the liquid reactant. The shape of the liquid enclosure means is not critical, but may be varied to fill the space available for use in a system.

The gas impervious enclosure means may be varied substantially. This enclosure means may be provided with one or more apertures located beneath the level of the liquid reactant. The solid body contained within the reaction chamber formed by this enclosure means may be either a catalytic material or a reactant that is consumed in gas generation. It is immaterial whether a support is provided in the reaction chamber or the solid body is positioned on the inner surface of this enclosure means.

The type of support employed may be varied without the exercise of invention. Whether the gas impervious enclosure means is readily disassembled to render the interior accessible is a matter of choice. The shape of the gas impervious enclosure means is shown to be spherical, but may take practically any bulbous regular or irregular shape. It is preferred that the exterior surfaces of the gas impervious enclosure means be curved in at least one plane so that this enclosure means will be unstable if oriented with the center of gravity above the center of volume. The ballast weight associated with the gas enclosure means may be of any desired configuration. It is recognized that the function of the ballast weight may be achieved merely by forming one portion of the enclosure means of a more dense material or more massive construction than another portion. It is also appreciated that the centers of gravity and volume of the gas enclosure means may be separated merely by judicious choice of geometrical configuration. For example, in FIG. 2 if the lower inner shell 217 were formed as a cone rather than a hemisphere, the center of buoyancy would be displaced above the center of gravity even absent the ballast weight. It is generally preferred to utilize the ballast weight, however, to produce a relatively large displacement of the center of gravity with respect to the center of volume and thereby maximize stability in the orientation with respect to the liquid reactant desired.

The flexible conduit communicating the interior of the gas impervious enclosure means with the exterior of the liquid impervious enclosure means must be both liquid and gas impervious. As shown, the flexible conduit is formed of a flexible material. As an alternative this conduit may be formed of inflexible segments having flexible joints. The second conduit 241 when incorporated is preferably attached to the flexible conduit. Retaining the two conduits together minimizes the risk of the gas impervious enclosure means becoming fouled in the conduits for even a temporary period during tumbling of the gas generator. It is recognized that the second conduit may be concentrically fitted around the flexible conduit.

Still additional modifications will occur to those skilled in the art. It is accordingly intended that the scope of my invention be determined with reference to the following claims.

What I claim and desire to secure by Letters Patent of the United States is:

1. An attitude insensitive generator for producing gas by contact of a liquid reactant with a solid body providing a reaction surface comprising:

liquid impervious enclosure means defining a chamber for confining the liquid reactant, spherical gas impervious enclosure means defining a reaction chamber having the solid positioned therein, said gas impervious enclosure means lying within the first chamber and being completely supported by the liquid reactant and including, means for offsetting the center of gravity of said gas impervious means with respect to its center of volume to maintain the spherical enclosure means in the same position with respect to the surface of the liquid reactant supporting it even with displacement of the liquid impervious means to provide thereby an attitude insensitive generator, aperture means in said gas impervious spherical enclosure means for communicating the reaction chamber with said (first) liquid confining chamber, said aperture means being located on a lower portion of said gas impervious enclosure means lying below the level of the liquid reactant, and flexible conduit means being interconnected to communicate an upper portion of the reaction chamber with the exterior of said liquid impervious enclosure means.

2. An attitude insensitive gas generator according to claim 1 additionally including means for controlling fluid pressure within said liquid impervious means.

3. An attitude insensitive gas generator according to claim 2 in which said controlling means is comprised of check valve means for fluidly communicating interior and exterior portions of said gas impervious means at a location above the level of the liquid reactant.

4. An attitude insensitive gas generator according to claim 1 in which said liquid impervious enclosure means is comprised of a plurality of portions and means for sealingly uniting said portions.

5. An attitude insensitive gas generator according to claim 1 in which said gas impervious enclosure means is comprised of a plurality of portions and means for sealingly uniting said portions.

References Cited

UNITED STATES PATENTS

| | | | |
|---|---|---|---|
| 150,995 | 5/1874 | Zwietusch | 23—282 |
| 254,930 | 5/1882 | Davidson | 23—282 |
| 3,323,873 | 6/1967 | Horn et al. | 23—281 |
| 3,393,983 | 7/1968 | Washington | 48—2 |

JAMES H. TAYMAN, Jr., Primary Examiner

U.S. Cl. X.R.

23—211; 48—2, 4, 19